US012098580B2

(12) United States Patent
Deutsch

(10) Patent No.: US 12,098,580 B2
(45) Date of Patent: Sep. 24, 2024

(54) QUICK RELEASE DOOR ROLLER ASSEMBLY

(71) Applicant: Daniel A. Deutsch, Ringoes, NJ (US)

(72) Inventor: Daniel A. Deutsch, Ringoes, NJ (US)

( * ) Notice: Subject to any disclaimer, the term of this patent is extended or adjusted under 35 U.S.C. 154(b) by 0 days.

(21) Appl. No.: 18/299,803

(22) Filed: Apr. 13, 2023

(65) Prior Publication Data

US 2023/0265701 A1 Aug. 24, 2023

Related U.S. Application Data

(63) Continuation of application No. 16/897,460, filed on Jun. 10, 2020, now Pat. No. 11,655,659.

(51) Int. Cl.

| | |
|---|---|
| ***E05D 15/22*** | (2006.01) |
| ***E05D 15/24*** | (2006.01) |
| ***E06B 3/48*** | (2006.01) |

(52) U.S. Cl.

CPC ........... *E05D 15/22* (2013.01); *E05D 15/242* (2013.01); *E06B 3/485* (2013.01); *E05D 2015/225* (2013.01); *E05Y 2900/106* (2013.01)

(58) Field of Classification Search

CPC ................... E06B 3/485; E06B 3/5063; E06B 2003/7044; E06B 9/581; E06B 2009/585; E05D 15/22; E05D 15/242; E05D 2015/225; E05Y 2900/106; E05Y 2201/688

See application file for complete search history.

(56) References Cited

U.S. PATENT DOCUMENTS

| | | | | |
|---|---|---|---|---|
| 702,204 A * | 6/1902 | Hamilton | E21B 43/127 | 403/83 |
| 1,136,444 A * | 4/1915 | Schubert: | E05C 17/32 | 217/60 F |
| 4,527,579 A * | 7/1985 | Knotter | A45B 9/00 | 403/100 |
| 5,056,579 A * | 10/1991 | Krafutler | E06B 9/581 | 160/264 |
| 5,601,133 A * | 2/1997 | Krupke | E06B 9/581 | 160/265 |
| 5,829,504 A * | 11/1998 | Ekstrand | E05D 15/165 | 160/277 |
| 6,039,106 A * | 3/2000 | Gontarski | E06B 9/58 | 292/228 |
| 6,792,998 B2 * | 9/2004 | David | E05D 15/165 | 16/DIG. 1 |
| 8,297,333 B2 * | 10/2012 | Meichtry | E05D 15/24 | 160/205 |
| 11,085,230 B2 * | 8/2021 | Shanahan | F25D 23/021 | |
| 2002/0179254 A1 * | 12/2002 | Schulte | E06B 9/90 | 160/201 |

* cited by examiner

*Primary Examiner* — Abe Massad

(74) *Attorney, Agent, or Firm* — Gottlieb, Rackman & Reisman, PC

(57) ABSTRACT

An improved vertical lift door roller assembly has a wheel pivotally mounted to a shaft. The shaft is placed within a spring loaded locking cylinder. The locking cylinder is movable between a first position where it restricts pivoting of the wheel and a second position where the wheel is able to pivot. The door roller assembly is mountable to a support a vertical lift door, such as a bracket or a hinge. The roller wheel can be pivoted to decouple the roller from a vertical lift door wheel track and to reseat the wheel in the track.

15 Claims, 11 Drawing Sheets

QUICK RELEASE DOOR ROLLER ASSEMBLY

CROSS-REFERENCE TO RELATED APPLICATIONS

This application claims priority to U.S. patent application Ser. No. 16/897,460 filed Jun. 10, 2020, the entire contents of which is expressly incorporated by reference.

FIELD OF THE INVENTION

The present invention relates to an improved roller assembly for use with vertical lift doors and similar systems.

BACKGROUND

Vertical lift doors are very popular systems used on home and commercial garages and other spaces where a large entryway is required. A conventional door is comprised of a plurality of rectangle panels hinged together in a vertical array. A J-channel track runs vertically along each side of the door and then continues upwards or bends to run horizontally over the ceiling. Roller wheels are mounted on stems coupled to the door panels and the wheels ride within the J-track to hold the door in place and support it as the door is raised and lowered.

A drawback to a conventional garage door assembly is that the enclosed garage space cannot be ventilated without lifting the door. Lifting the door even partially creates an open space at the bottom of the door. However, doing this provides an opening through which anything at ground level, such as water or snow and animals, to enter. It may also provide a security risk by allowing easy access to the garage interior. In addition, partially opening the door may have only a limited effect on venting of hot air smoke, engine exhaust, or other emissions that rise to the top of the garage.

Another drawback is that it can be difficult to remove a roller wheel from the J-track or reseat a roller wheel into the track without unbolting the entire roller wheel mount and then rebolt it later. This can be difficult if the bolts are rusted, the loose parts can easily be lost, and users may simply prefer not to have to disassemble door hinges and brackets. An alternative is to bend the track to flatten out the J portion at one point, move the door so the wheel is next to the bent part of the track, and then pry the track away from and over the wheel at that point. The pry process is repeated to reinsert the wheel into the track and the track is then bent back into shape. Although this is suitable for occasional maintenance, the bending and prying cannot be done by hand. It can also damage the track and can increase the likelihood of a wheel jumping the track in the area where the track has been bent.

Accordingly, there is a need for an improved roller wheel assembly that can be easily seated into and removed from a J-track of a vertical lift door without having to deform the track. There is a further need for an improved roller wheel assembly that can be used on a garage door to allow the top panel or other panels of the door to be selectively detached from the track so that those panels can be dropped down to provide an opening at the top of the door. This opening can provide ventilation and other access to the garage space without having to lift the door up from the ground.

DESCRIPTION OF THE DRAWINGS

These and other needs are addressed by a quick release door roller assembly as disclosed in detail below with references to the accompanying drawings in which.

DETAILED DESCRIPTION

Figure 1A:
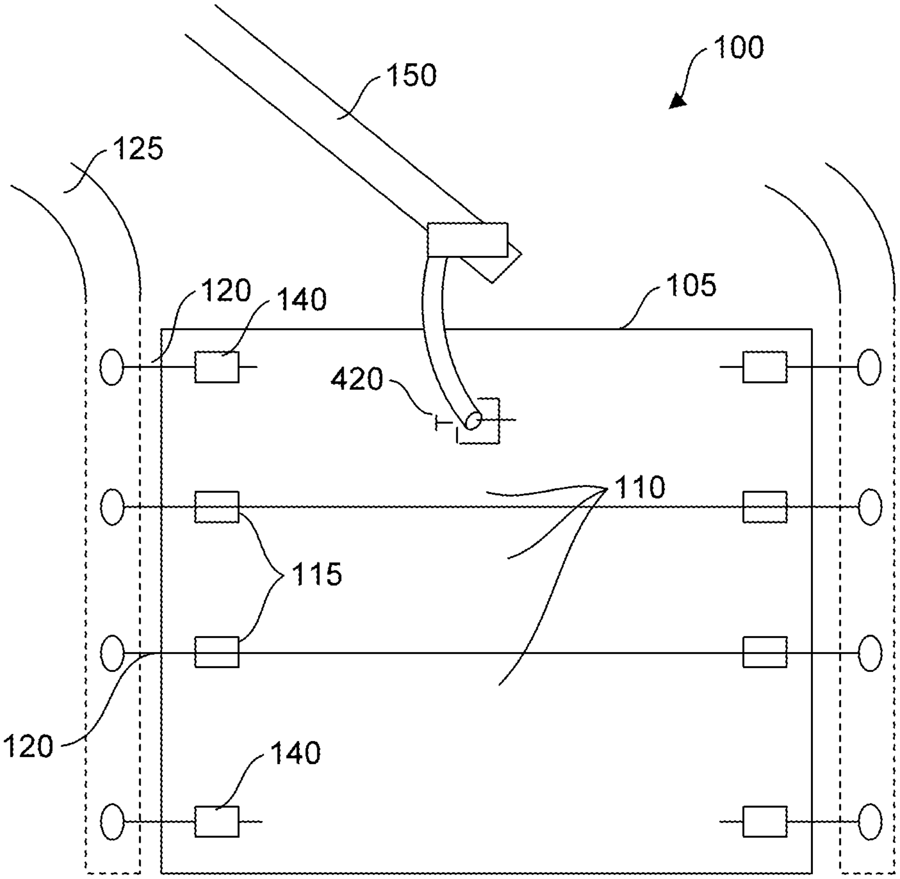
(Prior Art) FIG. 1A
FIGS. 1A and 1B illustrate a vertical lift door assembly with conventional (prior art) rollers.
Figure 1B:
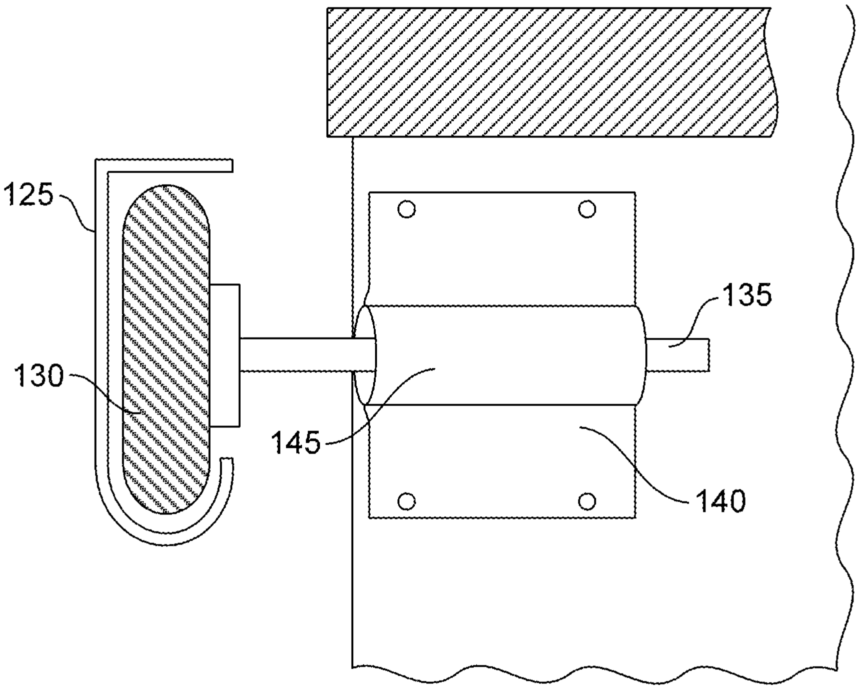
(Prior Art) FIG. 1B

FIGS. 1A and 1B are a schematic illustration of a conventional vertical lift door assembly 100, such as used in a home or commercial garage. The door assembly 100 has a door portion 105 which is generally comprised of a plurality of rectangular panels 110. Adjacent panels are connected by hinges 115. Each side of the door 100 is supported by a plurality of rollers 120 that ride in a J-channel track 125. Each roller is comprised of a wheel 130 and a stem 135. Typically a roller 120 is mounted adjacent each hinge 115 with the stem 135 of the roller 120 passing through a support formed on the hinge 115. In addition, rollers 120 are mounted adjacent each of the top and bottom corners of the door 100 using brackets 140 with the stem 135 passing through a support 145, such as a cylindrical receiver or a pair of rings. A lift assembly 150 can be used to raise and lower the door 100.

Figure 2A:
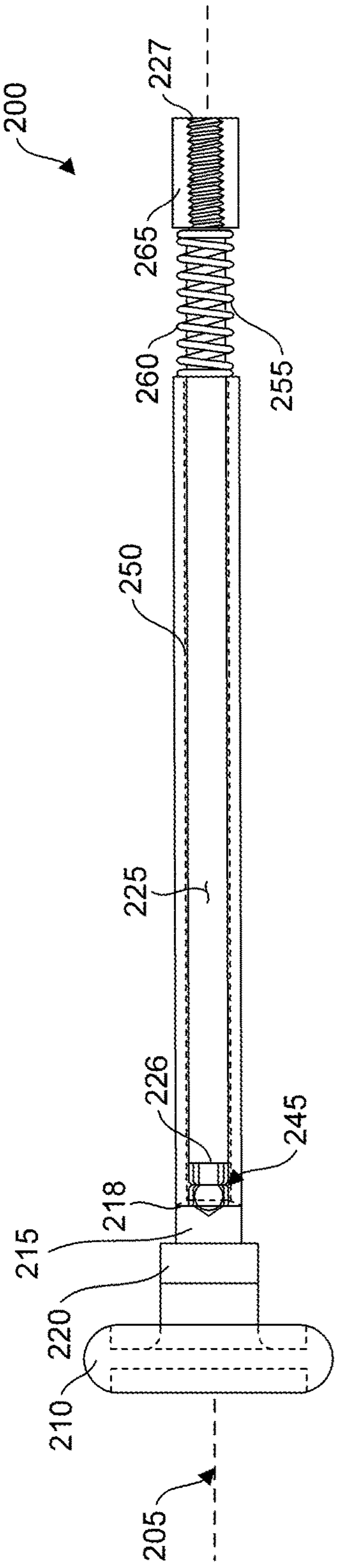
FIGS. 2A-2C illustrate an embodiment of an improved roller assembly according to aspects of the present invention.
Figure 2B:
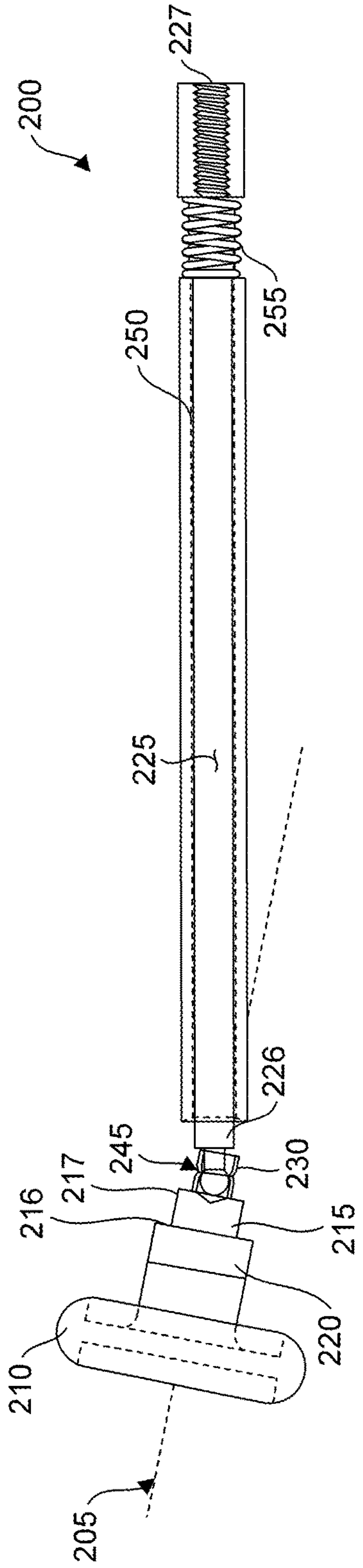
Figure 2C:
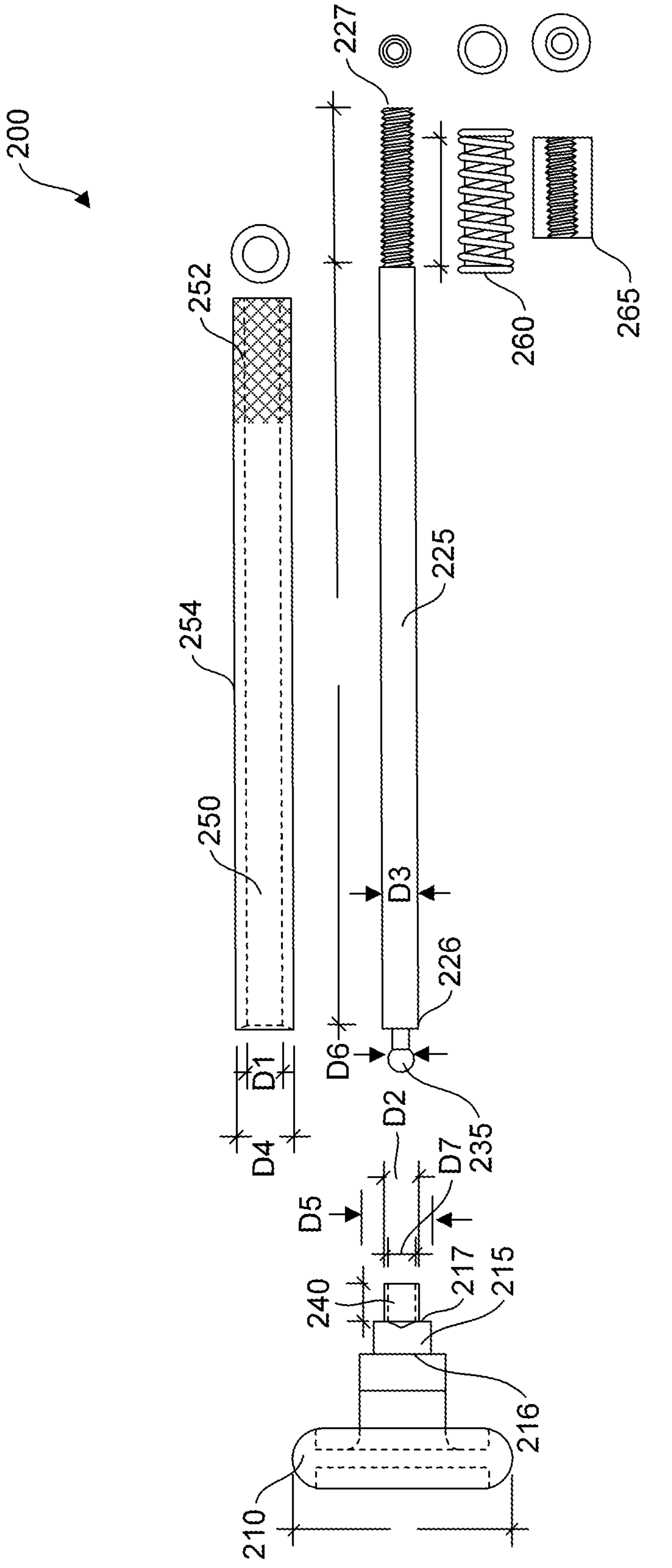

FIGS. 2A and 2B show an embodiment of an improved roller assembly 200. FIG. 2C is an exploded view of the assembly 200 of FIGS. 2A and 2B. Use of the improved roller assembly 200 allows sections of a vertical door to be easily detached and reconnected from the track without the use of tools or having to bend and then pry the J-track away from the wheel. In a particular use, the improved roller assembly 200 can be used to connect the top corners of the top panel of the door to the track. Decoupling the rollers from the track allows the top panel of the door to be dropped down to provide an opening for ventilation and other purposes without having to raise the door off of the floor.

With reference to FIGS. 2A-2C, roller assembly 200 comprises a wheel 210. A first shaft 215 is coupled to the wheel at an inner end 216 and extends along a central axis 205 away from the wheel to an outer end 217. The first shaft 215 can be coupled directly to the wheel 210 or indirectly, such as with a bearing assembly 220.

A second shaft 225 has inner and outer ends 226, 227. The inner end 226 of the second shaft is connected to the outer end 217 of the first shaft with a pivot joint 230. The pivot joint 230 allows the second shaft 225 to be offset at an angle relative to the central axis 205. The maximum offset angle should be sufficient enough to allow the wheel 210 to be tilted sufficiently for removal from the J-track in a manner as discussed below. The maximum offset angle could be 45 degrees, 30 degrees, 20 degrees, or even less depending on the overall dimensions of the wheel and depth of the track. In a particular embodiment, the pivot joint 230 allows for an offset of at least 10 degrees.

In the illustrated embodiment the pivot joint 230 is a ball and socket joint with a ball 235 extending from the inner end 226 of the second shaft 225 and seated within a socket 240 formed within the outer end 217 of the first shaft 215. A crimp 245 can be made in the socket 240 to retain the ball 235 in place. Other ball and socket designs can be used instead. Also, the ball and socket joint could be reversed, with the ball formed on the first shaft and the socket formed on the second shaft. Other types of pivot connections 230 known to those of ordinary skill in the art could also be used. Preferably the pivot joint allows the second shaft to be offset relative to the first in any direction around the axis 205. However, a more limited pivot joint, such as a simple hinge, could be used instead.

A locking cylinder 250 surrounds at least a portion of the second shaft 225. The internal diameter D1 of the locking cylinder 250, diameter D2 of the first shaft 215 at least in a region adjacent the outer end 217, and diameter D3 of the second shaft 225 (FIG. 2C) are sized so that the locking cylinder 250 can slide over the second shaft 225 and is movable between (i) a first position (FIG. 2A) in which the locking cylinder 250 surrounds at least a portion of the first shaft 215 and/or the pivot connection 230 and a portion of the second shaft 225 and (ii) a second position (FIG. 2B) in which the first shaft 225 is outside of the locking cylinder and the pivot connection 230 is at least partially exposed.

When the locking cylinder 250 is in the first position, the locking cylinder 250 retains the first and second shafts 215, 225 in a substantially coaxial position. When the locking cylinder 250 is in the second position, enough of the pivot connection 230 is exposed to permit the first shaft to pivot relative to the second shaft.

A bias mechanism 255 can be provided to urge the locking cylinder 250 towards the first position. In a particular embodiment, the bias mechanism 225 comprises a spring 260 mounted adjacent the second end 227 of the second shaft 225 and held in place with an end cap 265 attached to the second end 227, such as by a threaded connection. Other bias mechanism can be used as well. Alternatively, the locking cylinder 250 can be retained in the first position with a locking mechanism, such as a spring loaded ball stopper, a removable pin, or other mechanism known to those of ordinary skill that can selectively keep the locking cylinder 250 in the first position.

Figure 3A:
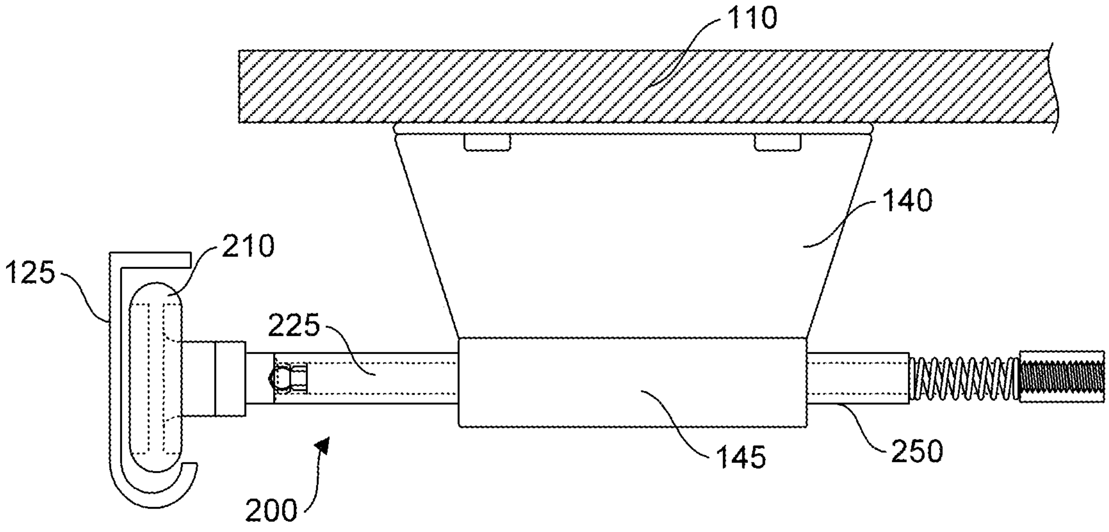
FIGS. 3A-3B show operation of the improved roller assembly to allow removal of the wheel from the track.
Figure 3B:
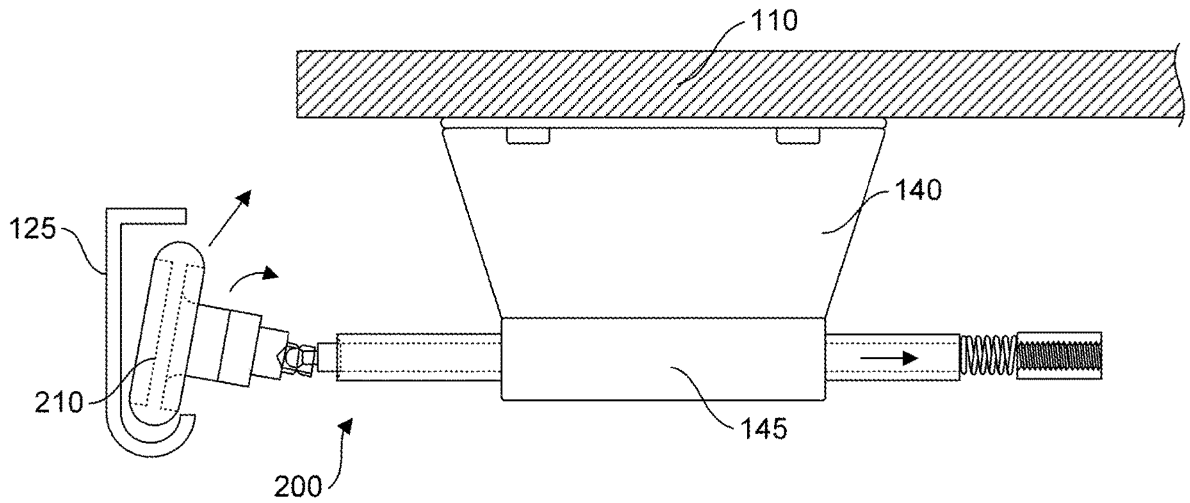

FIGS. 3A and 3B show use of the roller assembly 200 with a vertical door. The locking cylinder 250 (and second shaft 225 within) is inserted into support 145 of a bracket 140 attached to a door panel 110. In FIG. 3A, the locking cylinder 250 is in the first position and the wheel 210 is mounted in the J-track 125. The locking cylinder 250 prevents the first and second shafts 215, 225 from pivoting with respect to each other more than a minimal amount. In this position, the roller assembly 200 operates like a conventional door roller. In FIG. 3B, the locking cylinder 250 is moved to the second position. This allows the first shaft 215 to pivot relative to the second shaft 225, thereby permitting the wheel to be pivoted out of the J-track 125 removed from a door lift track of a vertical door when the door roller assembly is mounted to the door and the wheel is positioned in the track. To reseat the wheel 210 in the track the process is simply reversed.

To make it easier to grip and move the locking cylinder 250 between the first and second positions, an outer end portion 252 of the locking cylinder 250 can be knurled or provided with another type of textured surface. The mid-region 254 of the locking cylinder (See FIG. 2C) that will ride within the support 145 of a bracket 140 or a hinge when the roller assembly 200 is installed on a door is preferably smooth so the locking cylinder 250 can easily slide back and forth and also rotate as may be needed as the door is raised and lowered.

The dimensions of the various components of the roller assembly 200 depend to some extent on the particular environment to which the roller will be used. The diameter of the wheel 210 and outer diameter of the locking shaft should match the size of the J-track and the mounting brackets used. For a conventional 2 inch track, a standard wheel has an outer diameter of about 1 and 7/8 inches and the stem has an outer diameter of about 3/8 inch. A heavy duty roller has a wheel outer diameter of about 1 and 13/16 inches and a stem outer diameter of about 7/16 inch (0.44 inches)

In a particular embodiment of the improved roller assembly 200 for use as a replacement for a heavy duty roller as above, the locking tube 254 has an outer diameter D4 of about 0.44 inch and an inner diameter D1 of about 0.27 inch. The second shaft diameter D3 is slightly less than D1, about 0.26 inch. In the illustrated embodiment, an outer diameter D2 of the socket 240 at the end 217 of the first shaft 215 is substantially the same as the diameter D3. The first shaft can have a shoulder portion 218 at the inner side of the socket 240 with a diameter D5 substantially equal to the outer diameter D4 of the locking cylinder 250. The shoulder 218 provides a stop for the end of the locking cylinder when it is in the first position as shown in FIG. 2A. The ball 235 can have a diameter D6 of about 0.19 inch and the socket have an inner diameter D7 of about 0.21 inch.

In the illustrated embodiment, the locking cylinder should have a length at least sufficient for it to extend past the end of the support on the bracket to which it is intended for use with and the second shaft length should be longer than the locking cylinder to provide space for the bias mechanism. In one configuration, the locking cylinder length is at least 4.5 inches and the second shaft extends has a length of about one inch longer than the length of the locking cylinder.

The specific dimensions of the various components can be varied and scaled according to the desired size of the stem and the type of pivot joint and locking mechanism used.

While the illustrated embodiment selectively locks the pivot joint by use of a locking cylinder mounted over the second shaft, alternative locking mechanisms can also be used. For example, a much shorter locking cylinder could be provided that rides primarily on the first shaft and slides over the pivot joint towards the second shaft to lock the first and second shafts in position. Instead of a locking cylinder, the pivot joint could instead be locked in place with a pin that runs through the joint or an elastic clip that snaps over the joint. Removing the pin or clip would unlock the pivot joint. In yet a further variation, an axial bore could be formed in the first and second shafts and the pivot joint.

As a further alternative, instead of a locking cylinder surrounding the second shaft, an axial locking pin could be inserted through the axial bore in the first and second shaft and the pivot joint when the first and second shafts are aligned. In this position, the axial pin would lock the pivot joint. Partially withdrawing the axial pin would unlock the pivot joint. A bias mechanism, such as a spring, could be provided to urge the pin into the locked position.

Figure 4:
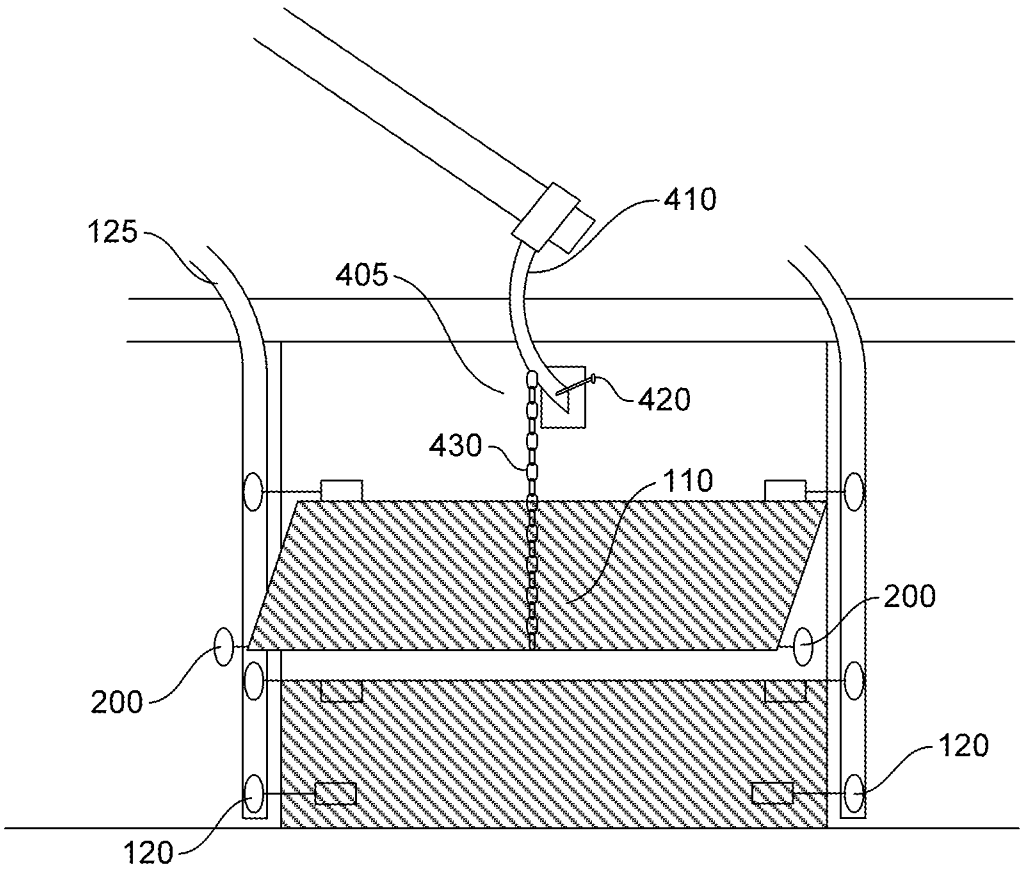
FIG. 4 shows an exemplary use of the improved roller assembly when mounted on a garage door.

As shown in FIG. 4, using the improved roller assembly 200 to couple the top corners of the top panel of the door 100 to the J-track 125 advantageously allows the top panel to be easily disconnected from the track and lowered. This opens up the top of the door providing an open area 405 for ventilation and improved lighting. The bottom part of the door remains closed, providing a barrier to entry.

Depending on how the door 100 is connected to the lift assembly, the connector to the lift assembly may need to be temporarily disconnected. There are various ways in which this can be configured. In one embodiment, a lifter arm 410 can be coupled to a bracket on the door panel and connected with a retaining pin 420. The arm connection to the door can be released by removing the retaining pin 420. Other mechanisms can also be used. A chain, rope, cable, or similar element 430 can also be connected to the lifter arm 410 and the door panel to allow the door panel to be more easily lowered and lifted.

Figure 5B:
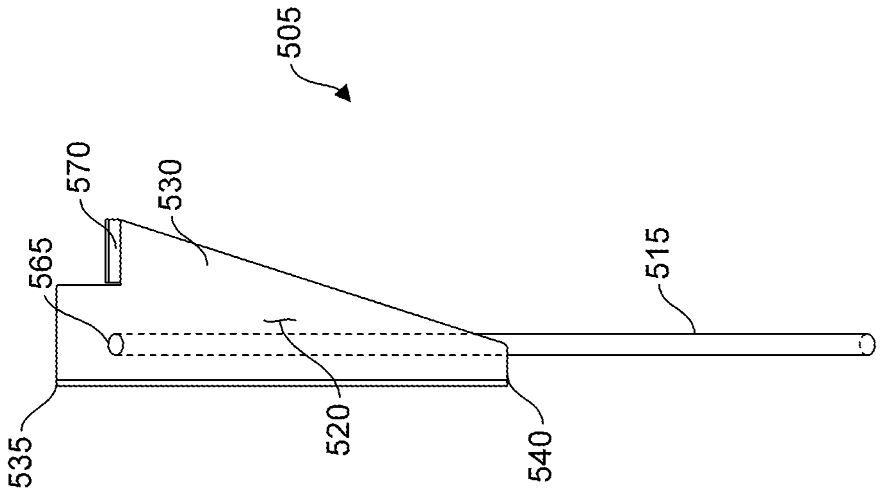
FIGS. 5A-5F illustrate a door panel support that can be used in conjunction with a door panel having the improved roller assembly.
Figure 5A:
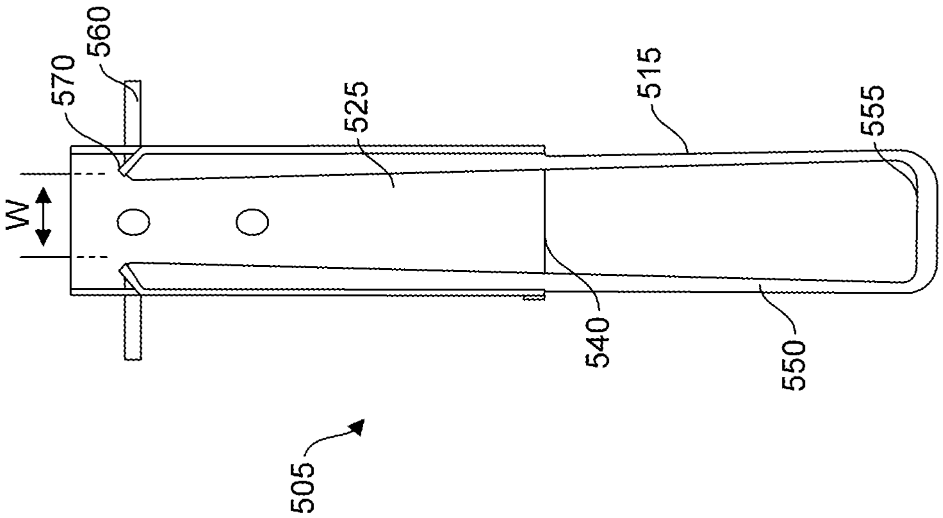
Figure 5C:
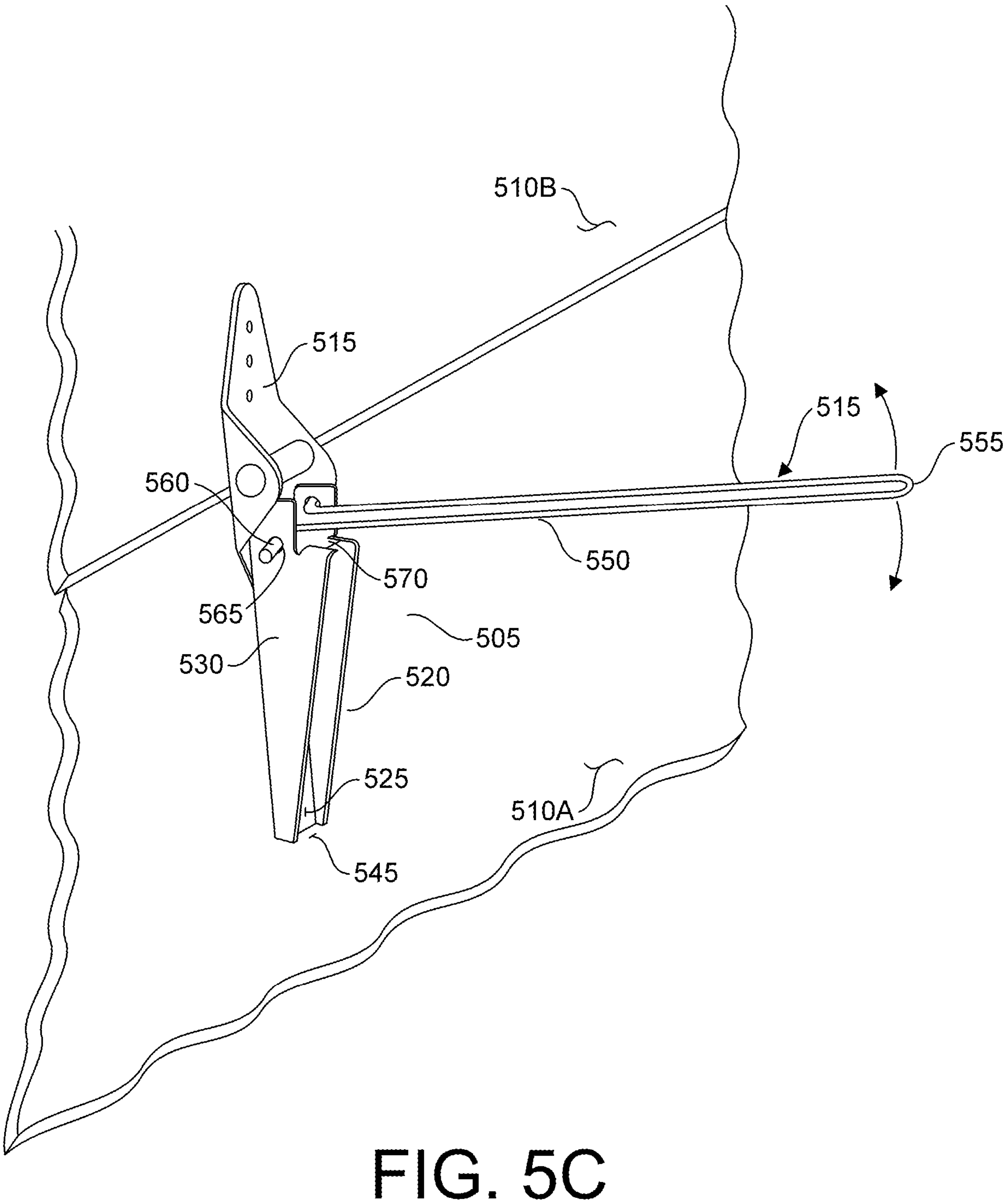

As an alternative or in addition to use of a cable 430, a deployable support bracket can be used to support a lowered door panel. FIGS. 5A and 5B show side and front views, respectively, of an embodiment of a support bracket 505. FIG. 5C shows support bracket 505 mounted on a door panel 510A beneath a hinge 515 that connects door panel 510A to an adjacent door panel 510B.

Bracket 505 comprises an elongated U-Shaped support 515 that is hingedly mounted into a body 520. The body 520 has a base 525 with a first end 535 and a second end 540. Two opposing sides 530 extend upwards from the base 525 and define a channel 545. The support 515 has a pair of elongated arms 550 extending from an outward end 555. Each arm 550 is rotationally coupled to a side 530, such as by means of an arm extension 560 extending at approximately a right angle from an end of the arm opposite the outward end 555 of support 515 and passing through a respective hole 565 in wall 530.

Figure 5D:
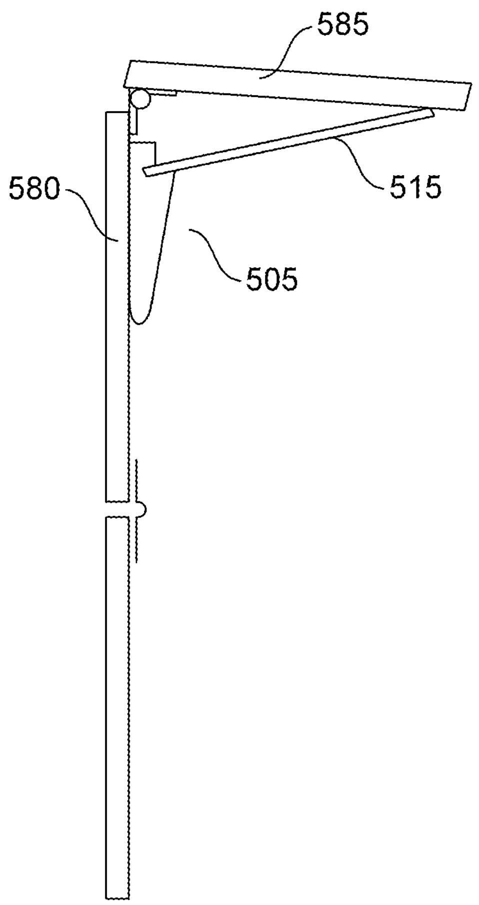

Opposing and inward facing shoulders 570 are formed along a portion of each wall 530 near the point where the arms 550 are coupled to the walls 530. FIG. 5C shows the support 515 in a deployed position. In this position, the shoulders 570 will prevent the support 515 from rotating downwards. The surface of the inward shoulders 570 can be tilted so as to urge the arms 550 apart from each other when weight is placed on the shoulder. The support 515 is made of a rigid material, such as a steel bar or other material, that is at least partially elastic. Arms 550 can can be squeezed together to reduce the distance between the arms in the area of the shoulders 570 to less than a gap width W between the two shoulders 570, thereby allowing the support 515 to move between a stowed position within the channel 545 as shown in FIGS. 5A and 5B and a deployed position as shown in FIG. 5C. With reference to FIG. 5D, a bracket 505 can be mounted on a door panel 580 below a door panel 585 that can be decoupled from the track and lowered as discussed herein. The support 515 of the bracket 505 in the deployed position can support door panel 585 when lowered.

Figure 5F:
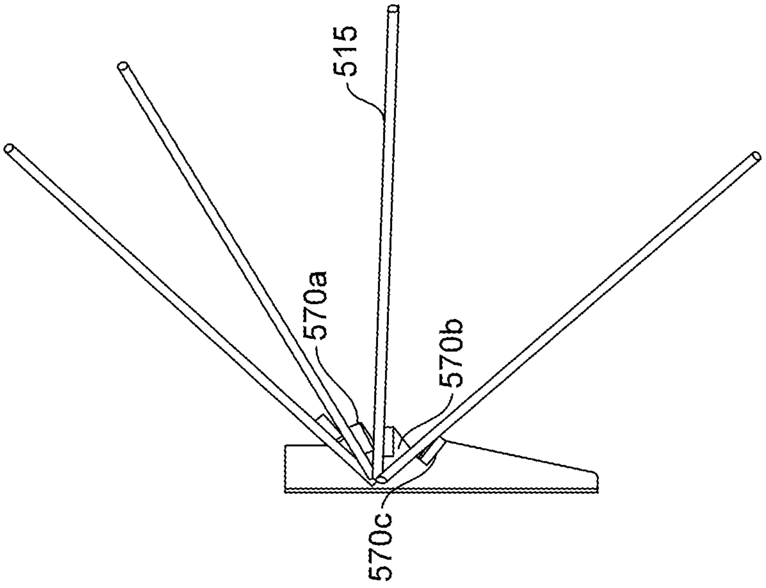
Figure 5E:
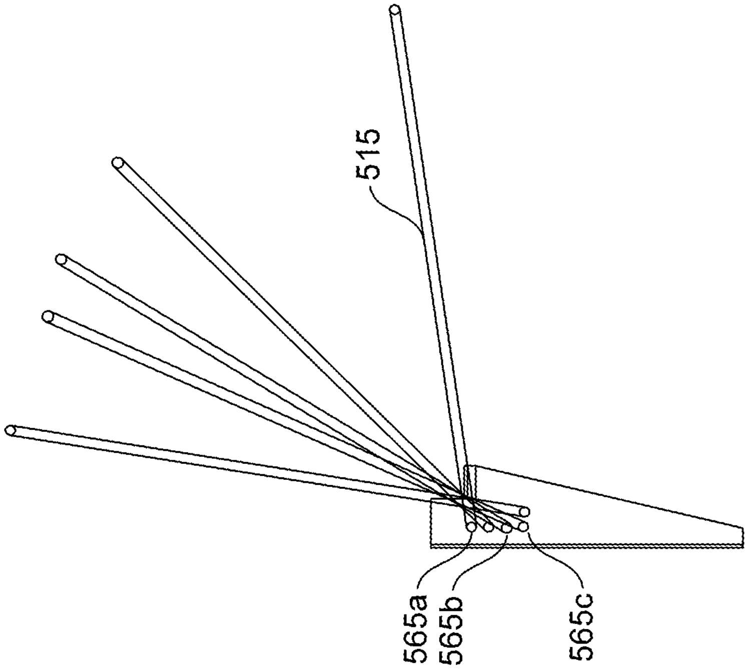

The position of the hole 565 relative to the shoulder 570 determines the angle of the support 515 relative to the body 520. As shown in FIG. 5E, multiple pairs of opposing holes can be provided in each side 530, such as holes 565*a*, 565*b*, and 565*c*. A user can vary the angle of the support 515 by mounting the support 515 into different pairs of holes. In an alternative, and as shown in FIG. 5F, multiple shoulders can be provided for use with a support 515 mounted in a single hole, such as shoulders 570*a*, 570*b*, and 570*c*. The user can vary the angle of the support arm by selecting the particular pair of shoulders as a rest for the support. Each shoulder can be angled so that it defines a plane that at least approximately reflects the angle of the support 515 when placed on that shoulder.

By selecting appropriate combinations of hole and shoulder position the support bracket 505 can hold an upper door panel decoupled from the track at an angle from only a few degrees, such as about 5 to 10 degrees, where the door panel is open only slightly and provides some ventilation while preserving privacy, to nearly 180 degrees, where the panel is almost fully dropped down. Rubber or plastic coverings can be added to the support 515 and the bracket body 520 to reduce the likelihood that the support 505 will scratch a supported door panel.

Various aspects, embodiments, and examples of the invention have been disclosed and described herein. Modifications, additions and alterations may be made by one skilled in the art without departing from the spirit and scope of the invention as defined in the appended claims.

The invention claimed is:

1. A roller assembly for use in a vertical lift door and comprising:

a wheel having a central axis;

a bearing connected to the wheel;

a first shaft having an inner end connected to the bearing and extending along the central axis to an outer end;

a second shaft having an outer end and an inner end and a length LS;

a pivot joint connecting the inner end of the second shaft with the outer end of the first shaft;

an elongated cylinder having an outer end, an inner end and a length LC less than LS, a middle portion of the cylinder having a substantially smooth outer surface;

the second shaft extending through the elongated cylinder, the inner end of the elongated cylinder being closer to the pivot joint than the outer end of the elongated cylinder, the cylinder being slidably movable relative to the second shaft from a first position where the pivot joint and the inner end of the second shaft are exterior to the elongated cylinder, to a second position where the pivot joint is within the elongated cylinder and the inner end of the elongated cylinder abuts a portion of the first shaft;

a bias mechanism on the outer end of the second shaft configured to apply force to the outer end of the elongated cylinder to urge the elongated cylinder to the second position;

wherein the wheel is configured to ride within a track of a vertical lift door and the elongated cylinder is configured to be mounted within a lateral cylinder of a support attached to the vertical lift door, the lateral cylinder having an inner diameter greater than an outer diameter of the elongated cylinder.

2. The roller assembly of claim 1, the first shaft having an outer portion adjacent the outer end, an inner portion adjacent the inner end, and a step between the outer portion and inner portion; the outer portion of the first shaft having a diameter D2, the inner portion of the first shaft having a diameter greater than D2;

the elongated cylinder outer diameter substantially equal to the diameter of the outer portion of the first shaft and where when in the second position, the inner end of the elongated cylinder abuts the step of the first shaft.

3. The roller assembly of claim 2, wherein the pivot joint comprises a ball and socket joint, a socket of the pivot joint formed in the outer portion of the first shaft, a ball of the pivot joint attached at the inner end of the second shaft and retained with the socket.

4. The roller assembly of claim 1, the bias mechanism comprising a cap attached to the outer end of the second shaft and a spring captured between the cap and the outer end of the elongated cylinder, the cap having an outer diameter substantially equal to the outer diameter of the elongated cylinder, the spring having an outer diameter substantially equal to the outer diameter of the elongated cylinder;

wherein the elongated cylinder can be mounted within the lateral cylinder of the support by inserting the cap into the lateral cylinder and pushing the roller assembly to move the cap through the lateral cylinder to position the middle portion of the elongated cylinder within the lateral cylinder of the vertical lift door support.

5. The roller assembly of claim 4, wherein the outer diameter of the elongated cylinder is substantially equal to one of ⅜ inches and 7/16 inches.

6. The roller assembly of claim 1, further comprising the support, the elongated cylinder passing through the lateral cylinder of the support with the middle portion of the elongated cylinder within the lateral cylinder and the inner end and outer end of the elongated cylinder external to the lateral cylinder.

7. A method comprising the steps of:

providing a vertical lift door assembly having a track, a plurality of hingedly connected panels, and a support attached to one of the panels, the support having a lateral cylinder oriented substantially normal to the track;

providing a door roller comprising a wheel, a first shaft with inner and outer ends, a second shaft with inner and outer ends, and an elongated cylinder with inner and outer ends, the inner end of the first shaft connected to the wheel, the outer end of the first shaft connected to the inner end of the second shaft with a pivot joint, the second shaft passing through the elongated cylinder and wherein the elongated cylinder is slidably movable relative to the second shaft from a first position where the pivot joint and the inner end of the second shaft are exterior to the elongated cylinder, to a second position where the pivot joint is within the elongated cylinder; and mounting the door roller to the vertical lift door assembly with the wheel in the track and the elongated cylinder within the lateral cylinder of the support so that a middle portion of the elongated cylinder is within the lateral cylinder and the inner and outer ends of the elongated cylinder are external to the lateral cylinder with the elongated cylinder in the second position.

8. The method of claim 7, wherein the support comprises one of a bracket and a hinge.

9. The method of claim 7, further comprising the steps of:

moving the elongated cylinder to the first position; and removing the wheel from the track by pivoting the wheel relative to the second shaft while the elongated cylinder is in the first position.

10. The method of claim 9, further comprising the steps of;

after the step of removing the wheel from the track, pivoting the wheel relative to the second shaft while the elongated cylinder is in the second position to seat the wheel in the track and place the first shaft and second shaft substantially in axial alignment; and moving the elongated cylinder to the first position after the wheel is seated in the track.

11. The method of claim 9, wherein the door roller further comprises a bias mechanism at the outer end of the second shaft, the bias mechanism configured to urge the elongated cylinder towards the first shaft to place the elongated shaft in the second position;

the step of moving the elongated cylinder to the first position comprises the steps of grasping the second end of the elongated cylinder and pulling the elongated cylinder away from the first shaft until the pivot joint is exposed.

12. A method for operating a vertical lift door assembly comprising a door, a first track adjacent a first door edge and a second track adjacent a second door edge, the door comprising a plurality of panels including a top panel and a second panel, the top panel having a top edge, first and second side edges and a bottom edge and being hingedly attached at the bottom edge to the second panel, a first support attached to the top panel adjacent the first edge and top edge, and a second support attached to the top panel adjacent the second edge and top edge, the method comprising the steps of:

providing first and second door rollers, each respective door roller comprising a wheel, a first shaft with inner and outer ends, a second shaft with inner and outer ends, and an elongated cylinder with inner and outer ends, the inner end of the first shaft connected to the wheel, the outer end of the first shaft connected to the inner end of the second shaft with a pivot joint, the second shaft passing through the elongated cylinder and wherein the elongated cylinder is slidably movable relative to the second shaft from a first position where the pivot joint and the inner end of the second shaft are exterior to the elongated cylinder, to a second position where the pivot joint is within the elongated cylinder;

mounting the first door roller to the first support on the top panel with the wheel of the first door roller in the first track and the elongated cylinder of the first door roller in the second position; and mounting the second door roller to the second support on the top panel with the wheel of the second door roller in the second track and the elongated cylinder of the second door roller in the second position.

13. The method of claim 12, further comprising the steps of:

moving the elongated cylinder of the first door roller to the first position and pivoting the wheel of the first door roller to remove the wheel of the first door roller from the first track;

moving the elongated cylinder of the second door roller to the second position and pivoting the wheel of the second door roller to remove the wheel of the second door roller from the second track; and lowering the top panel towards the second panel.

14. The method of claim 13, further comprising the steps of, after the step of lowering the top panel towards the second panel:

lifting the top panel up from the second panel;

for each of the first and second door rollers:

moving the respective elongated cylinder to the second position;

while the respective elongated cylinder is in the second position, pivoting the respective wheel relative to the respective second shaft to seat the respective wheel in the respective track and place the respective first shaft and respective second shaft substantially in axial alignment; and moving the respective elongated cylinder to the first position after the respective wheel is seated in the track.

15. The method of claim 13, further comprising the steps of:

providing a panel support mounted to the second panel and having an elongated support arm rotationally attached thereto, the support arm being movable from a stowed position generally adjacent the second panel to a deployed position extending outwards from the second panel;

the step of lowering the top panel towards the second panel further comprising the steps of moving the support arm to the deployed position and resting the top panel on the support arm.

* * * * *